United States Patent [19]
Perez

[11] 3,971,642
[45] July 27, 1976

[54] GAS SCRUBBER

[75] Inventor: Manuel Perez, River Vale, N.J.

[73] Assignee: Aerosols Control Corporation, Montvale, N.J.

[22] Filed: Dec. 18, 1974

[21] Appl. No.: 533,860

Related U.S. Application Data

[62] Division of Ser. No. 279,848, Aug. 11, 1972, Pat. No. 3,856,487.

[52] U.S. Cl. ............................ 55/223; 55/227; 55/229; 55/233; 55/242; 55/250; 55/259; 261/17; 261/98; 261/72 R; 261/118; 261/DIG. 9; 261/DIG. 54
[51] Int. Cl.² ........................................ B01D 47/00
[58] Field of Search ............. 55/223, 225, 227–229, 55/233, 242, 250, 259, 260; 261/6, 118, 119 R, 98, 17, DIG. 54, DIG. 9, 72 R

[56] References Cited
UNITED STATES PATENTS

| 821,425 | 5/1906 | Meehan | 55/227 |
|---|---|---|---|
| 1,073,620 | 9/1913 | Murray et al. | 261/DIG. 9 |
| 1,073,621 | 9/1913 | Murray | 261/DIG. 54 |
| 2,788,954 | 4/1957 | Paasche | 55/228 X |
| 3,324,629 | 6/1967 | Graswich et al. | 55/229 X |
| 3,465,504 | 9/1969 | Oropeza et al. | 261/17 X |
| 3,490,206 | 1/1970 | Doane | 55/242 |
| 3,595,536 | 7/1971 | Ripley | 55/223 X |
| 3,673,769 | 7/1972 | Gleason | 55/223 |
| 3,686,833 | 8/1972 | Rush | 55/228 |
| 3,739,555 | 6/1973 | Liebig | 55/233 |
| 3,750,375 | 8/1973 | Wintrell | 55/227 X |
| 3,770,061 | 11/1973 | Hall | 55/229 X |
| 3,789,585 | 2/1974 | Arnold et al. | 55/223 X |

Primary Examiner—Frank W. Lutter
Assistant Examiner—Kathleen J. Prunner
Attorney, Agent, or Firm—Robert A. Maikis

[57] ABSTRACT

A gas scrubber is provided for the removal of particulates and chemical contaminants from air and other gases. The particulates and chemical contaminants are removed from gas drawn through the scrubber, by inertial separation, spraying with water or liquid chemicals, and filtering techniques. A throat section of adjustable cross-sectional area is utilized in the scrubber to provide optimum air velocity and turbulence for maximum scrubbing efficiency over a wide range of air handling capacities. The cross-sectional area of the throat is adjusted by controlling the level of the liquid in a liquid-filled sump which is provided for the spray water or liquor. Removable filter baskets of variable depth are utilized during final treatment of the air or gas being cleaned.

6 Claims, 2 Drawing Figures

GAS SCRUBBER

RELATED APPLICATIONS

This is a division of application Ser. No. 279,848, filed Aug. 11, 1972, now U.S. Pat. No. 3,856,487 issued Dec. 24, 1974.

BACKGROUND OF THE INVENTION

1. Field of the Invention

This invention relates generally to pollution control devices and more particularly to an improved gas scrubber for removing particulates and chemcial contaminants from air and other gases.

2. Description of the Prior Art

Gas scrubbers are employed to remove pollutants and other undesirable matter from air or other gases. The pollutants to be removed comprise particulates which are essentially solid materials carried along in the air flow. Examples of this type of pollutants are dust from industrial grinding operations and fly ash from refuse burning. Additionally, the air or gas may contain chemical contaminants such as acid fumes or gases which are produced during chemical processes. Particulates and gaseous or liquid pollutants entrapped in the air are removed in prior art gas scrubbers by a wide variety of techniques. The particulates, for example, are often removed by inertial separation which results when an air stream moving at a relatively high velocity is suddenly changed in direction to expel the particulates by centrifugal force. Sprays of water or various liquid chemicals are injected into the air stream to remove chemical gases and liquid particles carried along in the stream. The sprays effectively "wash" the air and eliminate the undesirable chemicals by adsorbtion or chemical reaction with the liquid being sprayed. Finally, filters of various materials are employed for removal of various types of pollutants.

The presently known types of gas scrubbers generally are designed and built for specific applications and are constructed for a particular range of air flows. When the rate of air flow or the volume handled is changed for a particular scrubbed, the scrubber usually must be modified to handle the different air flow parameters with maximum cleaning or scrubbing efficiency. Consequently, any change in the process in which the gas scrubber is employed may result in costly and time-consuming modifications being made to the gas scrubber itself. Additionally, gas scrubbers using water or chemical sprays to wash the gas or air being treated are subject to periodic shut downs because the nozzles which spray the water or liquid chemicals become clogged with the pollutants trapped in the spray. Filters employed in known gas scrubbers are also subject to the requirement of frequent cleaning and other servicing to maintain a peak operating efficiency for the gas scrubber unit. Finally, it is desirable that all gas scrubbing equipment have low power and water requirements, be self-contained, mechanically-rugged and be of compact size and weight.

SUMMARY OF THE INVENTION

It is an object of this invention to provide a gas scrubber which is readily adapted for applications having a wide range of gas flow rates and which may be easily modified in the field to suit a wide range of applications.

It is a further object of this invention to provide a gas scrubber having a filter arrangement which provides for easy maintenance of the filter media and for adjustment of the depth of the filter media.

It is a still further object of this invention to provide a gas scrubber having no moving parts and which is of mechanically rugged construction.

It is an additional object of this invention to provide a gas scrubber having low power and water usage requirements and which is of compact size and weight.

Briefly, the gas scrubbing apparatus of the invention comprises a housing having a gas inlet and a gas outlet. Baffle means in the housing form a passageway connecting the gas inlet with the gas outlet. The passageway is provided with an adjustable throat portion having a reduced cross-sectional area and spray means are disposed in the throat portion to produce a liquid spray across the throat portion, so that gas passing through the throat portion from the gas inlet to the gas outlet is increased in velocity and turbulence and scrubbed by the liquid spray. The housing of the gas scrubber is provided with a liquid-filled sump portion and means are provided for controlling the level of the liquid in the sump portion. A fixed Venturi baffle raving inlet, outlet and central sections is disposed above the surface of the liquid in the sump portion and the throat portion of the passageway is formed by the space between the central section of the fixed baffle and the surface of the liquid in the sump portion, so that the cross-sectional area of the throat portion may be adjusted by adjusting the level of the liquid in the sump.

If desired, the sump portion of the housing of the gas scrubber of the invention may be divided into two sections or "stages" by a filter as taught in said application Ser. No. 279,848. One of the sump sections is then disposed beneath the throat area of the passageway in the housing, so that the heavy particulate matter and contaminants in the gas being scrubbed fall into the. said one section of the sump. The other section of the sump is utilized as the source of liquid for the spray nozzles in the housing, so that the filtered liquid drawn from the said other section of the sump prevents clogging of the spray nozzles. Additionally, removable filter baskets of the type disclosed in said application Ser. No. 279,848 may be disposed in the passageway in the housing adjacent the gas outlet to provide one or more final treatments for the gas passing through the scrubber.

The nature of the invention and other objects and additional advantages thereof will be more readily understood by those skilled in the art after consideration of the following detailed description taken in conjunction with the accompanying drawings.

DESCRIPTION OF THE PREFERRED EMBODIMENT OF THE INVENTION

Figure 1:
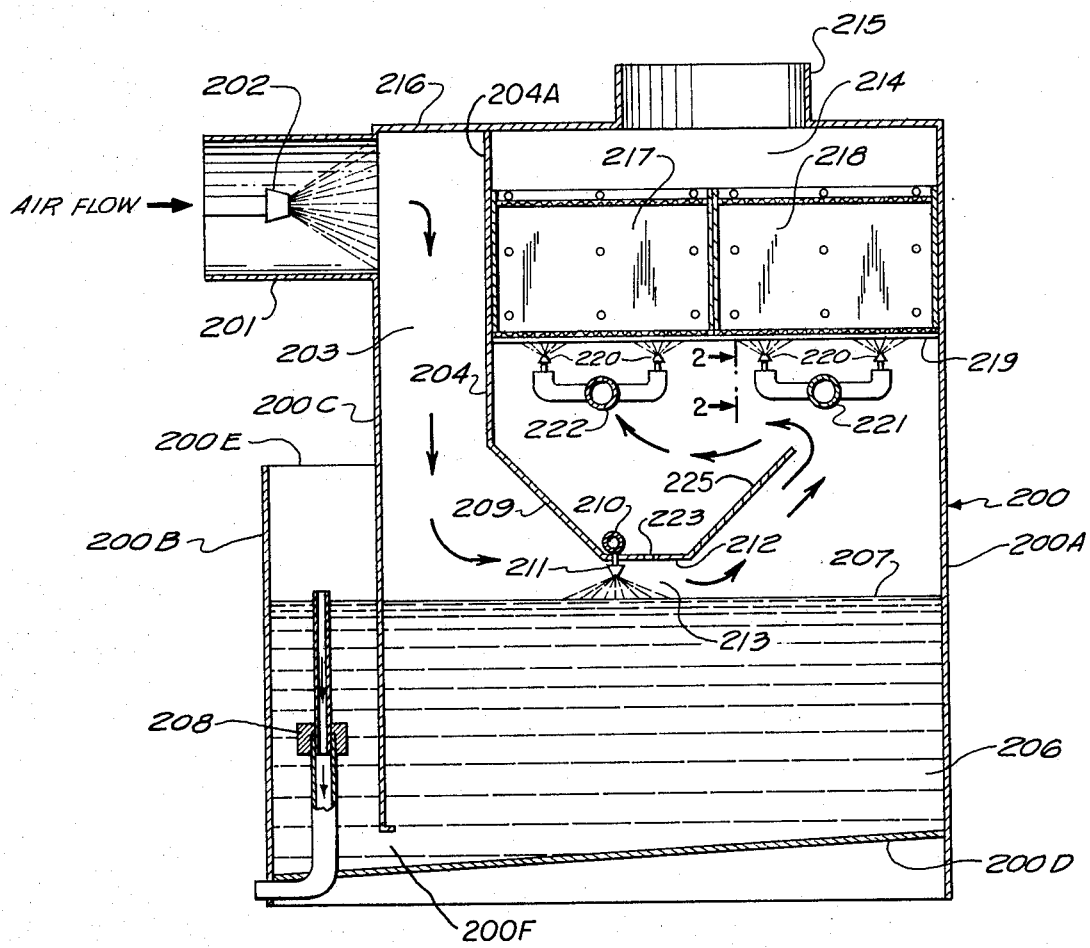
FIG. 1 is a side full sectional view of a gas scrubber constructed in accordance with the teachings of the present invention.

Referring now to FIG. 1 of the drawings, there is shown a gas scrubber constructed in accordance with the teachings of the present invention. The gas scrubber has a housing 200 which is provided with an air inlet duct 201 which is connected to a source (not shown) of polluted or dirty air or other gas. For example, the duct 201 may be connected to the flue of an incinerator to receive the combustion products of refuse burning. The housing 200 has an outlet duct 215 which is connected to a blower (not shown) which functions to physically draw the air through the gas scrubber from the inlet duct 201. In the previously mentioned example, where the inlet duct is connected to the flue of an incinerator, the blower may have its outlet connected back to the flue for venting to the atmosphere or may be connected to a separate venting arrangement. Although the gas scrubber of the invention will be described with reference to the removal of pollutants from air, it will be understood that it may be employed to remove pollutants or other undesirable contaminants from any gas. Accordingly, the inlet duct 201 may, for example, be connected to the waste gas output from a chemical process and the outlet of the blower connected to a stack or other venting arrangement for venting to the atmosphere. The housing 200 of the gas scrubber and the inlet and outlet ducts should preferably be constructed of a material which will not chemically react with the pollutants in the air or gas being treated. Accordingly, the housing and the hereinafter described interior parts of the scrubber may be constructed, for example, of a 12 gauge mild steel, stainless steel, a glass fiber material or a plastic such as polyvinyl chloride.

The housing 200 is a box-like enclosure constructed in essentially the same manner as the housing of the gas scrubber illustrated and described in said application Ser. No. 279,848 to which reference should be made for details of construction. The housing has a rectangular front panel 200A in which a pair of outwardly opening service doors (not shown) are provided for servicing the filter baskets of the gas scrubber, a first rectangular rear panel 200B which does not extend the full height of the unit, a second rectangular rear panel 200C, two h-shaped side panels (not shown), a top 216 and a rectangular sloping floor 200D. The side panels are connected by means such as welding, for example, to the top 216, the floor 200D, the front panel 200A, and the rear panel 200B to form a rectangular, box-like, liquid-tight enclosure or "sump" 206 in the lower portion of the housing. The rear panel 200C, which has a height somewhat less than the front panel 200A, is then welded to the top 216 and the side walls but is not welded to the floor 200D so that a rectangular opening 200F is formed between the bottom of panel 200C and the floor 200D. Since the second rear panel 200C of the housing extends below the surface 207 of the liquid filled sump 206, a gas-tight, box like enclosure is provided above the surface of the sump liquid between the air inlet duct 201 and the outlet duct 215. This box-like enclosure is defined by the top 216, the side panels, front panel 200A, rear panel 200C and the surface of the sump liquid. The two rear panels 200B and 200C are spaced apart to provide a horizontally-extending, rectangular opening 200E through which access may be had to the sump 206 to remove accumulated sludge. To facilitate sludge collection, the floor 200D of the unit is sloped downwardly toward the rear of the unit, so that the sludge collects underneath the opening 200E.

The air to be treated enters the inlet duct 201 and passes through an agglomeration spray from a nozzle 202 which tends to agglomerate the particulate matter in the air into heavy particles which fall into the sump 206. After passing through the agglomeration spray, the air is deflected downwardly through a passage 203 formed by a fixed venturi baffle 204, the housing side walls and the rear panel 200C of the housing. The fixed baffle 204 has a section 204A which is rectangular in shape and which is welded to the top 216 and the side walls of the housing to define the passageway 203. Although not illustrated, it will be understood that a two-stage sump, such as the sump disclosed in said application Ser. No. 279,848, may be employed in place of the single-stage sump shown in FIG. 1 if desired. The level of the surface 207 of the liquid in the sump may be controlled by an adjustable surface drain arrangement 208 and by a float valve (not shown) in the same manner as the gas scrubber shown in said application. The fixed baffle section 204 is provided, at the lower end thereof, with three sections 209, 212 and 225 which extend from side wall to side wall of the housing. Each of the sections may comprise a planar section which is connected between the housing side walls. The central section 212 is disposed substantially parallel to the surface of the sump liquid. The section 209 is an inlet section disposed at an acute angle with respect to the plane of the central section and is located on the upstream side of the central section. The section 225 is an outlet section which is similarly disposed on the downstream side of the central section. A horizontally-extending pipe 210 having a row of nozzles 211 spaced along the length thereof is mounted on the central baffle section 212, so that a substantially vertical curtain of liquid spray is formed across the opening 213 which is formed by the central section 212 of the baffle and the surface 207 of the liquid in the sump. The pipe 210 may be coupled by piping (not shown) to a supply of fresh water or to water or liquor in the sump as taught in said application Ser. NO. 279,848.

Accordingly, as the untreated air is drawn through the passageway 203 by the action of the blower, the cross-sectional area of the passageway is gradually narrowed down by the inlet baffle section 209 until it reaches the relatively small cross-sectional area of throat 213 which is formed by the central section 212 of the venturi baffle and the surface 207 of the liquid in the sump. At this point, the smaller cross-sectional area at the throat causes the velocity of the air drawn through the passageway to be substantially increased so that the Reynolds Number of the air flow is increased and turbulence is created at the throat to provide optimum atomization of the spray from the nozzles 211. As the atomization of liquid particles from the spray is increased by the high velocity of the air passing through the throat, the scrubbing efficiency is increased together with the pressure drop through the unit. The high velocity of the air stream through the throat 213 tends to atomize both the liquid from the spray nozzles 211 and the liquid which is sheared off from the surface of the sump liquid. Because of the disclosed arrangement, the cross-sectional area of the throat 213 may be easily controlled by means of the adjustable surface drain 208 or the float valve (not shown). When the gas scrubber is employed in a process having a relatively low rate of air flow, the water level in the sump may be raised to produce the high velocity needed for good scrubbing action. Similarly, when the scrubber is used in an application having a relatively high rate of air flow, the water level may be lowered to produce the same optimum velocity. As explained in said application Ser. No. 279,848, the throat area of the passageway formed by baffle sections 209, 212 and 225 acts as a single dimensional Venturi which permits a single size of gas scrubber to accomodate wide variations in the flow rate of the air being treated so that a unit in the field may be switched over to different processes or uses without expensive and time consuming structural modifications. The disclosed variable throat arrangement also provides a longer "residence" time for the air in the scrubber to thereby promote a more complete and thorough chemical reaction of the pollutants with the liquid spray. To this end, it may be noted that the liquid in the sump and the liquid employed for the sprays may be water or liquid chemicals which are used for treating chemical contaminants in the dirty air.

Figure 2:
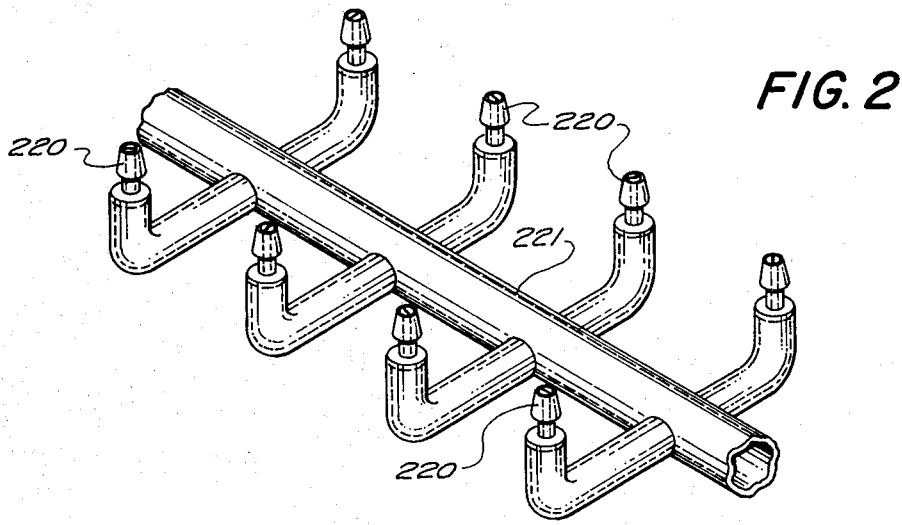
FIG. 2 is a perspective view of the nozzle and pipe arrangement employed to irrigate the filter baskets in the gas scrubber shown in FIG. 1 of the drawings.

After the scrubbed air leaves the throat portion 213 of the scrubber, it passes through a passageway 214 which is formed by the fixed baffle 204, the housing top 216, the front panel 200A, the housing side walls and the surface of the sump liquid. The passageway 214 is accordingly connected to the outlet duct 215 mounted on the top 216 of the scrubber housing. The filter section in passageway 214 consists of two removable filter baskets 217 and 218 which may be constructed in the same manner as the adjustable filter baskets disclosed in said application Ser. No. 279,848. Both filter baskets are slidably mounted on horizontally extending brackets 219 which are secured to the side walls of the scrubber housing. Since the baskets are mounted side by side in the output passageway 214, they may each be filled with the same filter media and may, if desired, be replaced by a single large basket. The undersides of the baskets 217 and 218 are irrigated by the liquid spray from four horizontally-extending rows of nozzles 220 which are connected to pipes 221 and 222. The pipe 221 and nozzles 220 mounted thereon are shown in detail in FIG. 2 of the drawings wherein it is seen that two rows of the nozzles 220 are supplied by a single one of the pipes 221 and 222. The pipes 221 and 222 may be connected to the water or liquor in the sump 206 by piping (not shown) or may be connected directly to fresh water, if desired. The spray produced by the nozzles 220 provides a further scrubbing action to remove fine particles from the air entering the output passageway 214 and also serves to irrigate the undersides of the filter baskets 217 and 218 to remove particulates and other matter which accumulates in the filter section. A row of apertures or holes 223 is provided across the length of the central section 212 of the baffle 204 so that water or other liquid falling down into the depression formed by the central section 212 and the upwardly extending inlet and outlet sections 209 and 225 of the baffle may pass through the apertures and back into the sump 206 of the unit. The liquid dripping through the holes 223 also forms a curtain of liquid drops across the throat area 213 and is atomized by the high velocity air passing therethrough to further increase the scrubbing efficiency of the unit. The disclosed gas scrubber of the invention may, if desired, also be provided with a two-stage gas filter section in the output passageway 214 as described in said application Ser. No. 279,848 and with additional spray means for greater scrubbing action. Similarly, inertial separation sections may also be added for further operating efficiency.

It is believed apparent that many changes could be made in the construction and described uses of the foregoing gas scrubber and many seemingly different embodiments of the invention could be constructed without departing from the scope thereof. For example, the configuration of the various passageways and sections in the gas scrubber could be changed in design and still provide the basic scrubbing and filtering actions required. Accordingly, it is intended that all matter contained in the above description or shown in the accompanying drawings shall be interpreted as illustrative and not in a limiting sense.

What is claimed is:

1. Gas scrubbing apparatus comprising
    a box-like housing having a pair of side walls, a liquid-filled sump extending between said side walls at the bottom of said housing, a gas inlet disposed above the surface of the sump liquid between said side walls adjacent one end of said housing for receiving a flow of gas to be scrubbed, and a gas outlet disposed above said sump liquid surface between said side walls adjacent the other end of said housing for discharging said gas flow after scrubbing;
    baffle means in the interior of said housing connected between said side walls above said sump liquid surface and cooperating with said surface of the liquid in said sump to form a passageway for said gas flow connecting the gas inlet with the gas outlet, said baffle means having a fixed Venturi baffle comprising a substantially planar central section connected between said housing side walls and disposed substantially parallel to said surface of the liquid in said sump to form a throat portion of reduced cross-sectional area in said passageway having a direction of gas flow therethrough which is substantially parallel to said sump liquid surface, a substantially planar inlet section connected between said side walls and disposed at an acute angle with respect to said central section on the upstream side of said central section, and a substantially planar outlet section connected between said side walls and disposed at an acute angle with respect to said central section on the downstream side of said central section;
    spray means mounted on the central section of said fixed Venturi baffle for producing a curtain of liquid spray across said passageway throat portion substantially perpendicular to the direction of gas flow therethrough; and
    means for controlling the level of liquid in said sump to thereby control the cross-sectional area of said passageway throat portion, whereby gas passing through said throat portion from said gas inlet to said gas outlet is increased in velocity and turbulence and scrubbed by the liquid spray.

2. Gas scrubbing apparatus as claimed in claim 1 further comprising
    at least one gas filter basket removably disposed in said passageway adjacent said gas outlet for filtering the gas passing therethrough.

3. Gas scrubbing apparatus as claimed in claim 2 further comprising
    second spray means mounted in said passageway adjacent said gas filter basket for irrigation of said basket.

4. Gas scrubbing apparatus as claimed in claim 3 wherein
    the central section of said fixed Venturi baffle is provided with a plurality of apertures extending therealong between said housing side walls to permit drainage into said sump of gas borne spray liquid accumulating on the side of said central section adjacent said gas outlet and filter basket, so that the liquid passing through said apertures falls into said sump across said passageway throat portion to thereby increase the scrubbing action therein.

5. Gas scrubbing apparatus as claimed in claim 1 further comprising second spray means mounted at said gas inlet for quenching the gas to be scrubbed.

6. Gas scrubbing apparatus as claimed in claim 1 wherein said fixed Venturi baffle has an additional substantially planar inlet section which is connected between said housing side walls and substantially perpendicularly disposed with respect to said central section on the upstream side of said inlet section adjacent said gas inlet for directing the gas from said inlet toward the surface of the liquid in said sump to provide inertial separation of the particulates and other contaminants in said gas flow.

\* \* \* \* \*